United States Patent [19]

Leatherman et al.

[11] Patent Number: 5,384,002
[45] Date of Patent: Jan. 24, 1995

[54] FLUTED PLASTICBOARD SEALING APPARATUS

[75] Inventors: Alfred F. Leatherman; Clyde P. Repik, both of Columbus, Ohio

[73] Assignee: William C. Heller, Jr., Milwaukee, Wis.

[21] Appl. No.: 63,457

[22] Filed: May 18, 1993

Related U.S. Application Data

[63] Continuation of Ser. No. 776,558, Oct. 15, 1991, abandoned.

[51] Int. Cl.$^6$ .................. B32B 31/20; B32B 31/26
[52] U.S. Cl. .................... 156/500; 156/198; 156/289; 156/308.4; 156/309.6; 156/311; 264/323; 425/384
[58] Field of Search ............ 156/198, 202, 499, 289, 156/311, 443, 500, 308.4, 309.6; 425/384; 264/322, 280, 323

[56] References Cited

U.S. PATENT DOCUMENTS

| | | | |
|---|---|---|---|
| 2,285,980 | 6/1942 | Jeckel | 264/322 X |
| 2,413,175 | 11/1968 | Rochla | 156/499 X |
| 2,745,129 | 5/1956 | Johnson | 15/245.1 |
| 2,749,020 | 6/1956 | Baxter | 156/499 X |
| 2,979,113 | 4/1961 | Stageberg | 156/499 |
| 2,994,361 | 8/1961 | Gable et al. | 264/248 |
| 3,038,982 | 6/1962 | Ludlow | 156/202 X |
| 3,111,716 | 11/1963 | Goodwin et al. | 425/145 |
| 3,185,604 | 5/1965 | Cameron | 156/311 X |
| 3,332,204 | 7/1967 | Frank | 156/311 X |
| 3,413,176 | 11/1968 | Port et al. | 156/499 |
| 3,929,943 | 12/1975 | Klimaszewski, Jr. | 264/322 X |
| 4,268,345 | 5/1981 | Semchuck | 156/499 |
| 4,515,648 | 5/1985 | Kolbe et al. | 156/198 X |
| 4,587,073 | 5/1986 | Jakobsen | 264/322 X |
| 5,057,175 | 10/1991 | Ashton | 156/289 X |

FOREIGN PATENT DOCUMENTS

| | | |
|---|---|---|
| 0288584 | 12/1986 | European Pat. Off. . |
| 0303576 | 7/1988 | European Pat. Off. . |
| PCT/AU90/-00462 | 9/1990 | European Pat. Off. . |
| 1431056 | 1/1966 | France . |
| 1186201 | 1/1965 | Germany . |
| 57-46828 | 3/1982 | Japan . |
| 57-150369 | 9/1982 | Japan . |
| 60-1900322 | 3/1984 | Japan . |

*Primary Examiner*—Jeff H. Aftergut
*Assistant Examiner*—Michele K. Yoder
*Attorney, Agent, or Firm*—Andrus, Sceales, Starke & Sawall

[57] ABSTRACT

The open edge of a plasticboard is moved into a heating and sealing unit having a metal form with a U-shaped cross-section. A spacing tape and a release tape line the metal form. An induction or resistance heater is coupled to the metal form to raise the temperature thereof and heat the open edge to form a molten plastic edge wall, with the outer edges of the edge wall in sealing engagement with the form. The molten plastic fills the cavity between the form and the edge wall and forms a solid, continuous end wall upon cooling of the molten plastic. A batch sealing unit has a form moved directly into engagement with the edge wall to be sealed. A continuous sealing unit has an elongated form. A conveyor moves the plasticboard through the form in a continuous flow path with the form inclined to the path of the edge board to establish relative lateral movement. A cooling unit cools the end wall as the board moves from the form. A release unit is located between the heating and sealing unit and the edge wall to insure release from the sealing unit and to accommodate any offset surface portion in the edge wall and thereby totally confine molten plastic and form a smooth end wall.

15 Claims, 2 Drawing Sheets

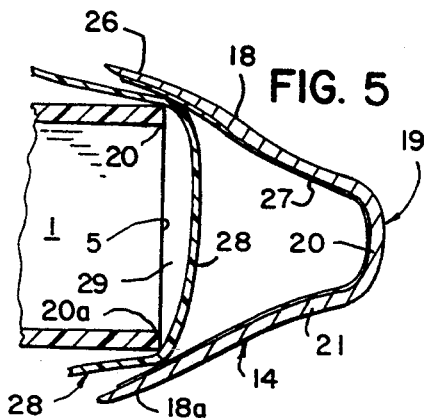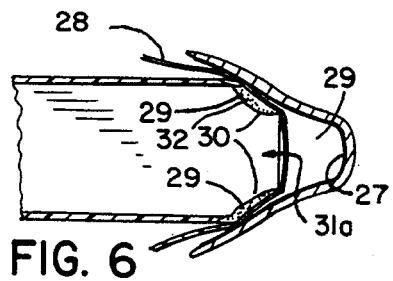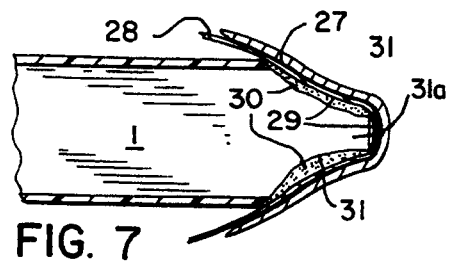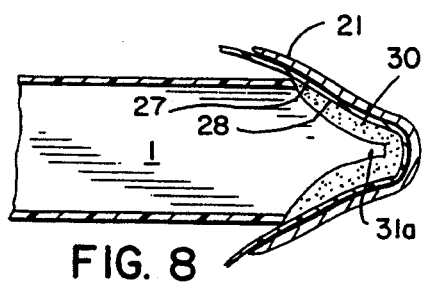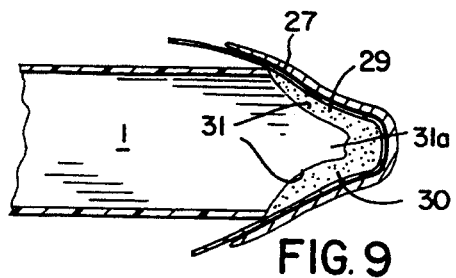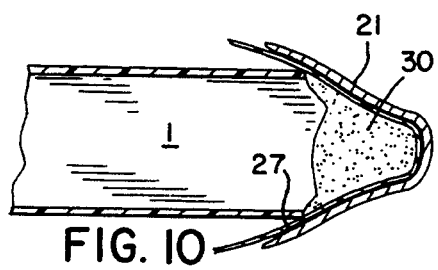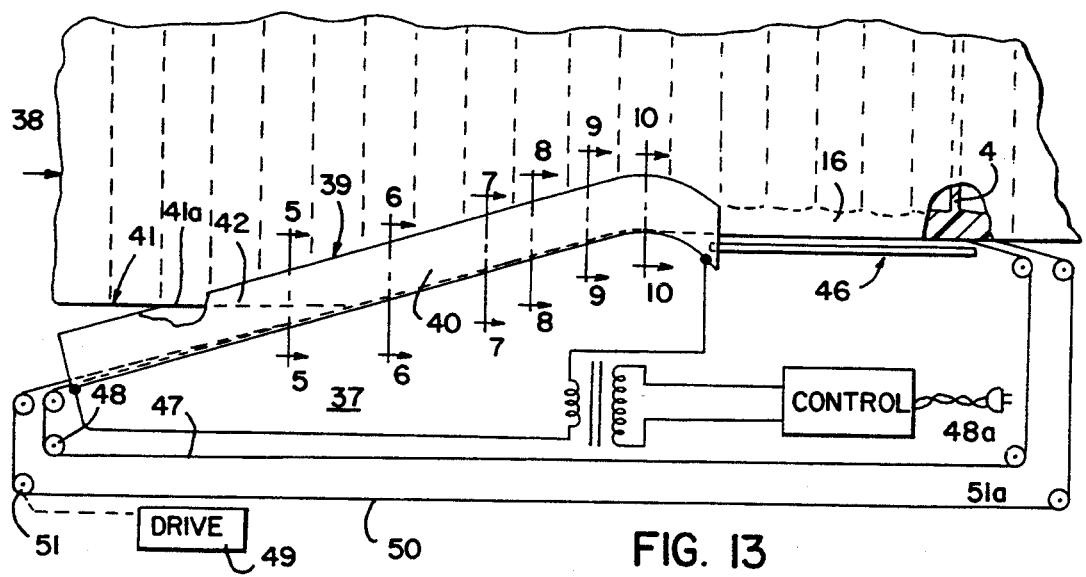

FLUTED PLASTICBOARD SEALING APPARATUS

This is a file wrapper continuation application of Ser. No. 07/776,558, filed Oct. 15, 1991 now abandoned.

BACKGROUND OF THE PRESENT INVENTION

This invention relates to a fluted plasticboard and more particularly to the method and apparatus for sealing of the open edge wall of a fluted plasticboard in which a corrugated core separates the opposed planar face members. Fluted board members formed of plastic have been developed and can be used in various applications in place of corrugated cardboard as well as in other applications which require a moisture resistant board or the other properties of plastic. A serpentine corrugated core member is located between spaced plastic sheet-like boards and are bonded along the crown or other edge portions of the serpentine core. Extruded fluted plasticboard is also manufactured in which the cross section defines planar surfaces separated by vertical spacing members defining square flutes and corresponding openings.

Such plasticboard is often used, for example, not only in containers but in display boards and the like. The United States Post Office has indicated that a container formed of a fluted plasticboard has a life of about nine times that of a conventional corrugated paper board. Although the plasticboard may have a significantly greater material cost factor, the savings and long life are such that significant increased usage of such material is occurring and even greater usage is anticipated.

The plasticboard is conveniently formed in large sheets with the board openings at the exposed edge walls of the core. These openings permit the entry of dirt and other foreign matter. The sealing of such edge walls is highly desirable.

Various methods have been suggested for the sealing of edge walls in laminated boards which might be applied to a fluted board. For example, U.S. Pat. No. 4,238,263 which issued Dec. 9, 1980 discloses the method of edge sealing a plastic laminate by passing an exposed edge wall between a pair of angularly related rollers which are located to engage the opposite corners or edges of the edge wall. A heating unit is applied to heat the edges of the laminated member just prior to passing between the rollers, which then serve to deform and move the edges downwardly into overlapped relationship to seal the edge. U.S. Pat. No. 4,201,609 which issued May 6, 1980 discloses a method of joining the face sheets of a laminate member wherein projecting edge portions are heated by a blast of hot air to soften the outer layers and deflect the softened edge portions toward each other substantially in the central plane of the material and melt to form a sealed end wall.

U.S. Pat. No. 3,711,352 which issued Jan. 16, 1973 discloses a paperboard with a fluted core in which the exposed edge walls of the fluted core is removed from adjacent the face sheets to provide projecting sheet portions which are folded upon themselves in a suitable automated apparatus and sealed to each other to seal the open edge.

Although such systems have been proposed, they all have certain disadvantages because of the complexity of the system or the special treatment required of the fluted board such as the removal of the fluted portion to provide the edges to effectively move into overlapping engagement.

Although various systems have been suggested for sealing of the edge, makers and users of fluted plasticboard have generally recognized that a practical high speed and effective sealing method and apparatus which produces an end product with a smooth and acceptable sealed edge is not readily available.

There is therefore a need for a simple, preferably on-line system, to process fluted plasticboard edges as manufactured and processed to seal the exposed edge in an aesthetically pleasing sealed edge structure.

SUMMARY OF THE PRESENT INVENTION

The present invention is particularly directed to a reliable method and apparatus for sealing of the open edge of fluted plasticboard without the addition of any other added closure or adhesive materials and producing an aesthetically pleasing and substantially smooth sealed edge.

The plasticboard is formed of a material which is adapted to be converted to a molten state by heating and then set cured to a solid state by subsequent cooling. Typically, a polyethylene, a polyproplyene or similar thermoplastic material is advantageously used with present day technology. Generally, in accordance with the teaching of the present invention, a heating and sealing unit includes a forming unit having a concave cross-section with an appropriate internal forming surface and an opening to the cross section just slightly larger than the plasticboard thickness. The inner forming surface of the forming unit may be covered with a release material to prevent sticking to the formed surface of the hot plastic of the plasticboard. The forming unit is located in operative contact with the open or exposed edge wall of the fluted plasticboard. A heating unit, such as a resistance heater, an induction heater or the like, is coupled to the forming unit and rapidly raises the temperature thereof to a sufficient temperature to convert the board's edge wall to a molten state permitting the movement of the exposed edge elements into a closed sealing engagement with the forming surface and forming an outer smooth and continuous surface essentially corresponding to that of the internal forming surface of the forming unit. The heating unit is operatively coupled to the forming unit for a period sufficient to create the molten edge, permitting relatively moving the elements into operative engagement, and is removed while maintaining engagement with the forming unit to allow the edge to cool, which may include a suitable forced cooling unit to rapidly set the edge to a self-forming supporting structure.

The forming unit is readily formed with a forming member of a relatively thin metal construction such that the unit rapidly heats to the effective operating temperature to convert the edge wall to the molten state, and also rapidly cools such that removal of the heat energy allows the edge to rapidly cool to convert the exposed edge wall to a finished self-supporting sealed edge, after which the edge can be separated from the tool unit. The design or pattern on the tool face shapes the edge to the conforming configuration, and can provide a simple smooth connecting edge or other patterned edge, as desired. Generally, the molten plastic of the fluted plasticboard enters into the fluted openings to create a strong, reliable and fully sealed edge wall.

The sealed edge wall defines a waterproof sealed board which can be formed into suitable containers or other board members which can be readily cleaned including steam cleaning or the like. The boxes or boards of the plasticboard can also be readily appropriately processed for recycling.

The molten plastic edge may tend to adhere to a metal forming element. A suitable release element is readily provided between the forming element and the edge. In practical application, a release unit included a layered unit providing a plastic release surface abutting the edge and a relatively soft surface to accommodate ripples or other surface roughness in the informal and formal edge.

The system can operate in a batch type application where the tool unit preferably includes a thin metallic forming member moved directly into engagement with the edge wall, is heated and then cooled to effect the solidifying and forming of the edge.

In high speed applications, a sealing and forming apparatus can be formed as an elongated heating and shaping unit of an appropriate cross section which changes to gradually produce the necessary deformation of the confined edge wall, or with relative lateral movement of the edge wall. A conveyor unit carries the fluted plasticboard through the forming or shaping unit in a continuous flow path. The shaping unit is conveniently mounted as a linear inclined unit to establish the desired relative operative lateral movement of the plasticboard.

The shaping unit preferably includes a forming member selected to have an upstream portion which is heated to convert the edge to a molten state as the plasticboard moves through the member and a downstream portion which is cooled to cool the molten edge and set the edge to the desired set shape. Finally, if desired, a final cooling unit such as a fluid jet including water, air or other fluid can be applied to the exposed sealed edge to complete the edge. In a practical sealing of the edge of a moving plasticboard, a spacer and a release belt unit of an endless movement is preferably interposed between the edge and the heating and cooling members.

In either the batch or continuous forming systems, the present invention establishes the sequentially heating and cooling of the confined edge wall to form an aesthetically pleasing sealed edge wall of any desired pattern or design without the use of a bonding agent or additional edge preparation.

For optimum operation with either resistance or induction heating, the metallic forming member is formed of a thin metal which is highly responsive to the input energy to provide a rapidly increasing temperature of the member to form the edge. In addition, a thin metal apparatus permits rapid cooling using any suitable forced cooling system to set the sealed edge.

The total system of this invention provides an effective apparatus and method for sealing the edge wall of a fluted plasticboard in a highly cost effective process.

DESCRIPTION OF THE DRAWING FIGURES

The drawings furnished herewith illustrate the best mode presently contemplated for carrying out the invention and are described hereinafter.

In the drawings:

FIG. 5 is an enlarged sectional view taken generally on line 5—5 of FIG. 4 and more clearly illustrating construction of the forming unit of the apparatus shown in FIG. 4;

FIGS. 6–10 are simplified sections similar to FIG. 5 and illustrating the forming sequence of the edge sealing apparatus in forming a sealed edge wall in the fluted plasticboard;

FIG. 13 is a plan view of a continuous edge wall forming apparatus for progressively sealing an edge wall in a fluted plasticboard of indefinite length.

DESCRIPTION OF THE ILLUSTRATED EMBODIMENT

Figure 1:
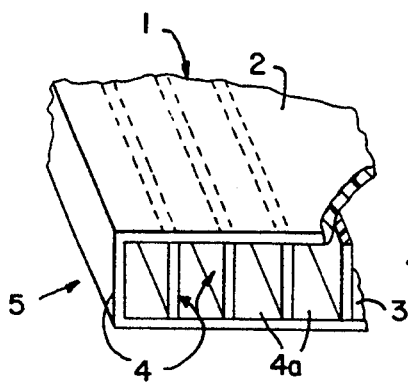
FIG. 1 is a pictorial view of a fluted plasticboard having exposed edge walls.
Figure 2:
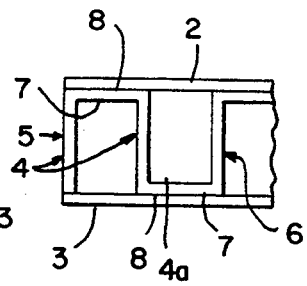
FIG. 2 is a side elevational view of a fluted plasticboard similar to FIG. 1 but formed of a plurality of separate parts.
Figure 3:
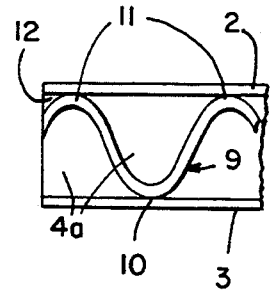
FIG. 3 is a view similar to FIG. 2 showing an alternate construction of a fluted plasticboard.

Referring to the drawings and particularly to FIG. 1, a commercially available fluted plasticboard 1 is illustrated. The plasticboard 1 includes first and second identical or similar sheet-like face member or substrates 2 and 3. Each substrate 2 and 3 is generally a corresponding relatively thin and flexible sheet-like member inter-connected at longitudinally spaced locations by integral cross beams 4 with relatively large openings 4a therebetween. The cross beams 4 provide a strengthening of the plasticboard 1 which is also a relatively light member as a result of the substantial openings 4a extending transversely across the board between the integral integrated beams 4 and defining open edge walls 5 at the opposite end edges of the board. Such plasticboard 1 may be used as replacement of corrugated paperboard and is widely used in signs, containers, and the like where a relatively strong but light weight member is desired. Alternate constructions of fluted plasticboards which are commercially available are illustrated in FIGS. 2 and 3. Referring to FIG. 2, the substrates 2 and 3 are separately formed and interconnected by a separate serpentine corrugated core 6. In the embodiment of FIG. 2, the corrugated core includes generally parallel beams 4 interconnected by parallel end members 7. An adhesive 8 is interposed between the end members 7 and the adjacent substrates 2 and 3 to appropriately bond the core 6 to the substrates and form a structure essentially corresponding to that of FIG. 1. FIG. 3 illustrates a structure which is similar to that of FIG. 2, with a serpentine core 9 having spaced curved walls joined by curved ends 10 and 11 which are suitably bonded to the substrates 2 and 3 to again form a fluted plasticboard. In the embodiment of FIG. 3 and in addition to the end edge openings, a small gap 12 will normally appear at the front and back edges of the plasticboard.

The present invention is particularly directed to edge sealing all such fluted plasticboard, as well as any other desired construction wherein closely spaced and opposing plastic substrates are interconnected by spaced plastic beam elements to strengthen the unit while minimizing the weight of the unit.

A preferred embodiment of the invention using a batch-type approach is illustrated in FIGS. 4–10 in which an edge wall heating and sealing apparatus or unit 13 is constructed to receive a fluted plasticboard 1 and to seal the edge wall 5.

An identical edge wall sealing unit, partially shown, may be similarly constructed and located to engage the directly opposite edge wall of the plasticboard 1.

Figure 4:
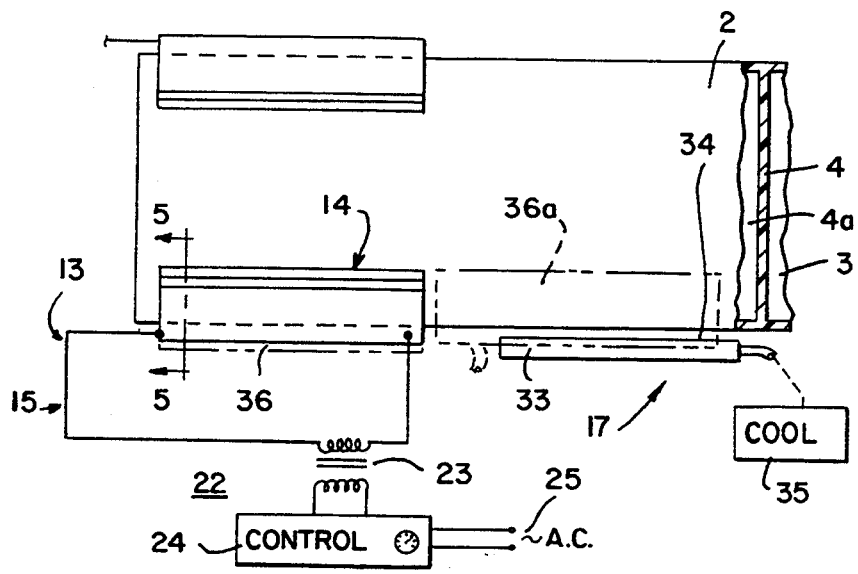
FIG. 4 is a plan view of a fluted plasticboard such as shown in FIG. 1 assembled with an edge wall sealing and forming apparatus illustrating an embodiment of the invention.
Figure 11:
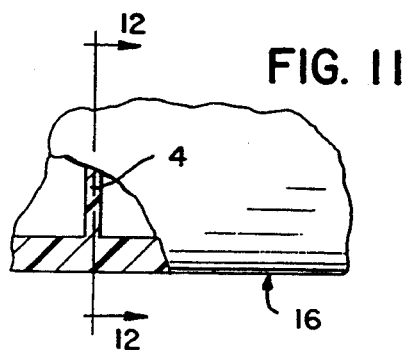
FIG. 11 is a plan fragmentary view of the sealed fluted plasticboard.
Figure 12:
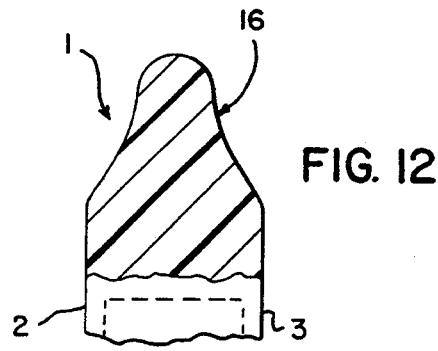
FIG. 12 is a sectional view taken generally on line 12—12 of FIG. 11.

Referring particularly to FIGS. 4 and 5, the edge sealing unit 13 generally includes an elongated form unit 14 located in telescoped relation to the adjacent longitudinal edge to be sealed. A heating unit 15 is connected to form unit 14 and is operative to raise the temperature of the form unit. The unit 13 is operative to heat and soften the edge wall 5 to a molten state and to then shape the edge to a smooth curved continuous edge wall 16, as shown in FIGS. 11 and 12, by the continuous confining and shaping of the end wall 5. Immediately downstream of the heating unit 15, a cooling unit 17 is shown coupled to the edge wall 5 to rapidly cool the molten edge wall 5 and set the edge into a self-supporting finished edge wall 16.

Referring particularly to FIG. 5, a cross sectional view of the sealing unit 13 and particularly the form unit 14 is illustrated applied to the edge wall of the plasticboard 1. The form unit 14 is an elongated assembly having a substantially U-shaped cross section. The assembly includes similar opposite side walls 18 and 18a joined by a smoothly shaped end wall 19. The end wall 19 and particularly the interior wall configuration, corresponds to the desired final shape of the finished sealing edge wall 16. The side walls 18 and 18a are spaced from each other at the entrance to the form unit 14 in accordance with the thickness of the plasticboard 1. The side walls 18 and 18a are thereby located in close spaced relation to the substrates 2 and 3 of plasticboard 1. The side walls 18 and 18a are curved walls which project over the edges 20 and 20a of the edge wall 5 for the distance desired or necessary to soften the board and permit movement thereof to the shaped end wall 19.

More particularly, the illustrated form unit 14 includes a U-shaped metal form 21 which is connected to the heating unit 15. The heating unit 15 is an electric resistance unit integral with the metal form 21 which is connected in series to a suitable power source 22. A step-down transformer 23 is shown connected through a control box 24 to an A.C. supply 25. The A.C. supply may be a standard 240 volt 60 hertz supply adapted to supply typically 100 amperes of current through the metal form 21. The control 24 permits adjustment of the current and the like.

In a preferred construction for batch-type applications, the metal form 21 is constructed of a length at least equal to the length of the largest corrugated edge wall 5 to be sealed. The form 21 has generally a hat-shaped cross section with the side walls 18–18a and the end wall 19 defining an outer tapered crown portion terminating in the smooth curved outer end wall 19 and an inner brim or flange section 26 having a curvature formed with the side walls 18–18a. The flange section 26 defines an opening slightly larger than the thickness of the corrugated plasticboard 1 and particularly the edge wall 5. A spacing layer 27 of a relatively soft material is interposed between the inner wall of the metal form 21 and the complementing mating edge of the plasticboard 1 to properly locate the fluted plasticboard 1 for heating and shaping. Layer 27 may be a suitable tape secured to the inner wall of the form 21. In addition, to insure a smooth movement of the fluted plasticboard 1 into and from the heating unit, a special release tape 28 is interposed between the fluted edge wall 5 and the spacing tape 27 to avoid bonding or sticking of the edge wall 5 to the form unit. The spacing tape 27 and the release tape 28 may be formed of any suitable high temperature material having a smooth guide surfaces. Thus, tape 27 may be plastic such as a polytetraflouroethylene known as PTFE, and presently sold under the trademark "Teflon" by DuPont Corporation of Wilmington, Del. The release tape 28 is preferably formed of polyimide plastic material such as the plastic presently sold under the trademark "Kapton" by the DuPont Corporation.

The spacing layer 27 provided by a glass reinforced "Teflon" tape, or other similar material, provides a soft or cushion type backing surface to the edge wall 5 and the release layer 28 insures separation of the molten edge wall plastic, during the process. The molten edges 20 and 20a of the edge wall 5 may have or develop a wavy edge, particularly in the corrugated plasticboard with the curved core such as shown in FIG. 3. The release layer is a thin material to provide a smooth end wall as well as a good release characteristic. As the board is forced into the form, the release film or layer 28 tends to engage the raised spots or area of the wavy edge. As a result, small openings may be created through which the molten plastic can flow from the cavity to the exterior of the substrates or panels 2 and 3. The cushion-effect of the spacing layer 27 between the form and the release material serves to deform the release layer and close an opening created at the release layer, and thereby confines the molten plastic to the forming cavity. The spacing and release elements were selected to withstand temperatures of about 60° F., conduct heat, form around the corner edges of the board while establishing the desired seal. In one embodiment, the "Kapton" release tape was 0.001 inches thick and the glass reinforced "Teflon" was 0.015 inches thick.

The form 21 is preferably formed of a material having a low co-efficient of thermal-expansion and will generally be a suitable alloy material. Stainless steel such as Stainless 304 would appear to be a reasonable choice if a special alloy is not readily available or considered necessary. A metal element of about 0.017 inches thick has been used in producing a sealed edge on a fluted plasticboard. Typically, the form is heated for about 7 to 8 seconds, followed by a cooling period of 15 to 20 seconds, without use of special cooling of the form.

Generally, in a fluted plasticboard having a thickness of about ¼ inch, progressively melting about 3/10ths of an inch of the board edge wall 5 supplies adequate molten plastic to seal the edge openings and create a reliable and formed closed edge wall.

However, the form member may be formed of any desired material which provides for adequate heating of the edge wall. An inductive heating system may be used with an appropriate metal form. Forms of a suitable dielectric material may be used which permit direct heating thereof as well as other materials for direct or indirect heating. Further, such form materials may avoid the use of the spacing or the release elements shown in the presently preferred embodiments.

Upon initial assembly, the edges 20 and 20a of the edge wall 5 abut the release tape 28 with a pressure engagement. Upon heating of the unit and particularly the form 21, the edges 20–20a change to a molten state. Simultaneously, an appropriate lateral pressure is established between the heated form 21 and the corrugated edge wall 5, causing the corrugated edge wall 5 to move inwardly into the cavity 29 formed between the form unit 14 and the end wall 5, as shown in FIGS. 6 and 7. The corners or edges 20-20a sealingly engage the form walls and confine the molten plastic 30 within the forming cavity 29.

More particularly, the outermost edge and end wall 5 of the plasticboard 1 is thus heated progressively and converted to a molten state as shown in FIGS. 7-10. The edges 20-20a melt with a slight concave configuration as shown at 31 in FIGS. 7-9, inclusive, with a central extended remaining core 31a. Plasticboard 1 and particularly the end edge wall 5 moves into the curved form 21 in continuous sealing engagement to confine the molten plastic 30.

The newly formed edges 20 and 20a of corrugated edge wall 5 thus continue to convert to a molten state and move further into the form with the molten plastic confined within the cavity 29 defined between the corrugated edge wall 5 and the outer portion and end wall 19 of form 21. The process is continued until the core 31a of the corrugated edge wall melts, with the unmelted edge moved substantially into the form and with the molten plastic 30 completely filling the space or cavity 29 between the unmelted corrugated edge wall 5 and the form 21. The molten plastic 30 fills the openings 4a in the edge wall 5 and also forms the continuous finished end wall 16.

The heating is then terminated, the assembly allowed to cool and the molten plastic 30 sets into the smooth outer finished end wall 16 over the corrugated edge wall 5, as shown in FIGS. 11 and 12.

An appropriate cooling medium can be applied to the form to more rapidly reduce its temperature and thereby promote solidification of the molten plastic material at least to an appropriate state for removal from the heating and sealing unit 13 with a sufficient self-supporting outer surface to allow separate environmental cooling or the like. Rapid removal of the formed edge in a self-supporting state requires minimal cooling of the form unit 14 and allows more rapid application and sealing processing of the next corrugated member. In the illustrated embodiment, a separate cooling unit 17 applies a cooling medium 34 directly to the exposed formed edge wall 5. The illustrated cooling unit 17 is a multiple jet cooling nozzle 33 of a length substantially corresponding to that of the edge wall 5 and mounted immediately adjacent to the discharge side of the form 21. A cooling fluid source 35 is coupled to the nozzle 33 and establishes the plurality of cooling medium jets 34 extending and applied to the outer face of the edge wall 5 as it moves from form 21. The cooling fluid may be of any suitable type, such as water, air or the like.

The nozzle 33 can also be provided with a recycling refrigerant and mounted in direct contact with the form 21 to effect the desired cooling. Depending upon the specifications and characteristics of the material as it leaves the illustrated cooling unit, any other coolant system can be applied directly to the formed edge, to the form 21 or to an extension of form 21. In commercial practice where the form is also cooled to set the edge wall as by a cooling source 36, the form may be advantageously formed as a thin walled tube member to permit rapid heating and alternately circulation of a suitable coolant or refrigerant through the thin wall tubing to rapidly cool the finished edge wall.

The separate cooling unit 34 may be formed as a continuous extension of the heating unit and form 21 as shown in phantom in FIG. 4 at 36a. The electrical connection to form 21 is made at the common connection and the coolant flow only extends to such common connection. The cooling unit 36a preferably has the same cross-section as the terminal end of the heating unit and has a circulating coolant cooling the edge wall engaging face to support and cool the edge as it moves through the unit 36.

The final board is shown in the fragmentary views of FIGS. 11 and 12. The end wall 16 is thus formed into a smooth curved configuration having a curved surface merging with the outer exterior plane of the substrates 2 and 3. The inventors have discovered that this provides a very simple, reliable and effective means for sealing the edge wall with a smooth, effective seal in a rapid and cost effective manner.

FIGS. 1-10 disclose a batch or stationary edge seal and forming unit. The present invention is also applicable in a continuous edge forming system for forming the edge wall of a fluted plasticboard 1 of an indefinite length greater than the length of the forming apparatus. A system establishing a continuous sealing of an elongated plasticboard is shown in FIG. 13. A special heating and sealing unit 37 is shown in combination with a transfer unit 38 for moving the edge to be sealed through the unit 37. The heating and sealing unit 37 includes a shaped form member or unit 39 with a constant cross section similar to that shown in FIGS. 6-10. The transfer unit 38 moves the edge wall to be sealed through the form unit 39 with an appropriate relative lateral movement so as to progressively melt and form the edge wall 5 to be sealed.

In the illustrated embodiment, the form member 39 includes a rigid metal form 40 mounted at an angle to the longitudinal plane or line of movement of the edge wall 5. As the edge 41, and 41a (shown in the broken away portion of FIG. 13) of edge wall 5 melt, the remaining and offset unmelted edges engage the form 40 as the result of the angular offset of the downstream portion of form 40.

In summary, the metal form again is constructed with sidewalls 42 and 42a engaging the outer corner edges 41 and 41a of the edge wall 5 to be sealed. As a result, the edges 41 and 41a are progressively heated to a deformation state and the relative lateral movement into the inclined form 40 causes the heated edges to maintain a sealed interengagement with the form, as shown in FIGS. 6-10. The molten plastic 30 is again confined to the cavity 29 between the end edge wall 5 to be sealed and the form 40 to form sealed end wall 16. The continuous line system thus functions in the same manner as the batch unit with the edges converting to a molten state and forming a smooth relatively solid end closure wall 16 of plastic overlying the corrugated edge wall 5.

The downstream end of the system is shown including a cooling portion 46 which may be formed as an extension of the heating unit or as a separate unit as shown, to confine the molten plastic and allow the confined plastic to cool to a self-supporting state. The cooling or discharge portion of the form may be specifically cooled to accelerate the solidification of the molten or flowing material. A suitable cooling unit, such as shown in FIG. 13, may be applied directly to the formed end wall 16 as it leaves the form structure.

In the illustrated embodiment of the invention shown in FIG. 13, spacing tape 47 is formed as a separate recycled element. The tape 47 is an endless member mounted on a pair of spaced driven pulleys 48 and 48a. A drive 49 coupled to the pulley 48 moves the tape 47 in synchronism with the movement of the fluted plasticboard 1 through the unit 39.

A release tape 50 is similarly mounted on spaced pulleys 51 and 51a for synchronized movement with the spacing tape 47 and the fluted plasticboard 1. The upstream tape pulleys 48 and 51 are mounted immediately upstream of the form 40 to continuously apply the tape to the edge of the fluted plasticboard 1 just prior to the entrance of the unformed edge wall 5 into the form unit 39 and particularly the form 40. The downstream pulleys 48a and 51a are similarly located downstream of the form 40, and preferably the cooling unit 46 where used, to release the tapes 47 and 50 from the fully formed edge wall 45 as it moves from the unit 37. Even where a cooling unit is used, the tapes may be released at the end of the heating form 40 where the edge has sufficient self support, or a highly finished edge is not specified.

The in-line process is particularly adapted for high speed, continuous production of a plasticboard member which is subsequently shaped and formed into a particular use. Although resistance heating of metal form is shown, any other heating system may be used. The shape and characteristic of the necessary form may not permit or be particularly adapted to low cost electric resistance heating. Induction heating apparatus may then be used, or some other form of direct or indirect heating of the form may be used. For example, an induction heating coil coupled to a metal form can rapidly heat the properly shaped metal member to a typical range of 300° to 400° F., within five seconds.

Although separate spacing and release members are shown and have been found to significantly contribute to a quality result, the use is dependent on the particulars of the plasticboard material and the sealing unit materials and structures. Further, other mediums and members may be used. For example, a suitable release film or coating can be directly adhered to the form. A single member of a suitable material having the necessary release surface and resilient characteristic will similarly function. By appropriate cooling or selection of materials of the plasticboard or form, the necessity for a release film or member may be unnecessary and then can be eliminated. The tapes shown and described not only provide for rapid release of the finished plasticboard, but form a smooth and shiny surface on the seal to improve the esthetics of the final product.

The present invention thus provides a direct means of sealing the edge of a fluted plasticboard without the necessity of any bonding or additional agents while establishing and effecting a smooth aesthetically pleasing seal and which should be a very cost effective manufacturing application. The methods and the apparatus are extremely simple and straightforward using present day materials and heating technology while solving a commercial problem which has been presented in the area of fluted plasticboards.

Various modes of carrying out the invention are contemplated as being within the scope of the following claims particularly pointing out and distinctly claiming the subject matter which is regarded as the invention.

I claim:

1. An apparatus for sealing the open edge wall of a fluted plasticboard having substantially rigid outer face boards connected by spaced connector walls, said face boards having aligned outer free edges, comprising a heated form unit having inclined sidewalls having sealing portions adapted to engage said free edges of the edge wall and an end wall spaced outwardly from said sealing portions to form a substantial confining chamber extending outwardly of said edge wall forming an essentially continuous smooth inner cavity surface between said sealing portions and said end wall, means to heat said form unit to a temperature to convert said plastic face boards and connector walls to a molten and flowing state, transport means for relatively moving said plasticboard through said form unit and establishing lateral pressure engagement between said sidewalls of said heated form unit and said outer free edges of said face boards and to form a substantial confining sealed chamber whereby the edges become plastic molten with relative movement of the melted face boards inwardly into said confining sealed chamber and with the molten plastic confined within the form unit as said plasticboard moves through said form unit and forming a substantial molten edge wall between said face boards having a continuous smooth outer surface extending outwardly from said outer free edges, and a cooling unit coupled to said form unit and cooling said molten edge wall within said form unit to a self sustaining state and thereby create a complete end closure wall between said face boards.

2. The apparatus of claim 1 including a reusable release member located between the heated form unit and said edge wall to prevent attachment of the molten edge wall to the unit.

3. The apparatus of claim 1 including a soft member between the heated form unit and said edge wall to positively seal offset portions of said edge wall and form said edge wall totally between said face boards.

4. The apparatus of claim 1 where said sidewalls and end wall form a tapered crown portion terminating in a smooth curved outermost wall and an inner open rim portion joined to the crown portion by a smooth curvature wall.

5. The apparatus of claim 2 including a soft member between the heated form unit and said release member to positively seal offset portions of said edges and form said edge wall totally between said face boards.

6. The apparatus of claim 1, including means to apply a cooling medium directly to the exposed end closure wall.

7. The apparatus of claim 1, wherein said cooling unit constitutes an integral extension of said form unit.

8. The apparatus of claim 7, including an interface member abutting said form unit and providing a cushioned surface engaged by the edges, and said interface member having an exposed surface formed to prevent adhesion to said molten plastic.

9. The apparatus of claim 1, including a release member located adjacent the form unit and engaged by said edges, means supporting said release member and moving said release member with said plasticboard to prevent attachment of the molten plastic to said form unit.

10. The apparatus of claim 9, including a thin soft member interposed between said release member and said form unit and deflected by said lateral pressure of said edges to maintain said sealed chamber, and means supporting said soft member and moving said soft member with said release member.

11. The apparatus of claim 9, wherein said release member is a thin endless member moving through a path having a linear portion moving with said plasticboard and a return portion connected to the opposite ends of said linear portion.

12. The apparatus of claim 11, wherein said release member has a smooth surface to establish a continuous smooth end closure wall extended between the face boards.

13. The apparatus of claim 11, including a thin, soft endless seal member located between said release member and said form unit within said linear portion of said path and said endless seal member having a return portion, said soft member establishing a cushioned engagement with said release member with said edges of said face boards and thereby deform said release member and maintain said sealed chamber in the presence of irregularity in said edges.

14. The apparatus of claim 13, wherein said release member is a tape member having a thickness on the order of 0.001 inches and said soft member is a Teflon tape on the order of 0. 015 inches.

15. The apparatus of claim 1, wherein said form unit is formed of stainless steel, and including means to pass electrical current through said stainless steel to directly heat the form unit.

* * * * *

UNITED STATES PATENT AND TRADEMARK OFFICE
CERTIFICATE OF CORRECTION

PATENT NO. : 5,384,002
DATED : January 24, 1995
INVENTOR(S) : Alfred F. Leatherman et al It is certified that error appears in the above-identified patent and that said Letters Patent is hereby corrected as shown below:

On the title page:Item [56] under "References Cited", delete 2,413,175 11/1968 Rochla 156/499X and add 3,413,175 11/1968 Rochla 156/499X; Column 13, line 7, Claim 15; delete "1" and substitute therefor ---13---.

Signed and Sealed this

Twenty-fifth Day of April, 1995

*Attest:*

BRUCE LEHMAN

*Attesting Officer*   *Commissioner of Patents and Trademarks*